United States Patent
Ueda et al.

(10) Patent No.: US 10,991,086 B2
(45) Date of Patent: Apr. 27, 2021

(54) ADHERED SUBSTANCE DETECTION APPARATUS

(71) Applicant: AISIN SEIKI KABUSHIKI KAISHA, Kariya (JP)

(72) Inventors: Koki Ueda, Kariya (JP); Takashi Suzuki, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/580,470

(22) Filed: Sep. 24, 2019

(65) Prior Publication Data
US 2020/0104991 A1 Apr. 2, 2020

(30) Foreign Application Priority Data

Sep. 27, 2018 (JP) .............................. JP2018-181204

(51) Int. Cl.
| | |
|---|---|
| *G06T 7/00* | (2017.01) |
| *G08B 5/22* | (2006.01) |
| *H04N 17/00* | (2006.01) |
| *H04N 5/225* | (2006.01) |
| *B60R 1/00* | (2006.01) |
| *H04N 5/445* | (2011.01) |

(52) U.S. Cl.
CPC .............. *G06T 7/0002* (2013.01); *B60R 1/00* (2013.01); *G08B 5/22* (2013.01); *H04N 5/2253* (2013.01); *H04N 5/445* (2013.01); *H04N 17/002* (2013.01); *B60R 2300/307* (2013.01); *G06T 2207/20021* (2013.01); *G06T 2207/30168* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 2004/0037457 A1* | 2/2004 | Wengender | ........... | G06T 7/0002 382/141 |
| 2006/0115121 A1* | 6/2006 | Saka | ..................... | G06T 7/0002 382/104 |
| 2007/0115357 A1* | 5/2007 | Stein | ..................... | H04N 7/181 348/148 |

(Continued)

FOREIGN PATENT DOCUMENTS

| | | |
|---|---|---|
| JP | 5521990 B2 | 6/2014 |
| JP | 2018-26671 A | 2/2018 |

*Primary Examiner* — Christopher G Findley
(74) *Attorney, Agent, or Firm* — Sughrue Mion, PLLC

(57) ABSTRACT

An adhered substance detection apparatus includes an obtaining portion configured to obtain captured image data outputted from an imaging portion, a detection portion configured to detect presence or absence of an adhered substance of each of plural regions of an imaging surface of the imaging portion on the basis of the captured image data, and a judgement portion configured to distinguish a reliable region and an unreliable region from each other, a reliability property of predetermined arithmetic processing performed by a processing apparatus with the use of the captured image data is kept to be equal to or greater than a predetermined value in the reliable region, and the reliability property is less than the predetermined value in the unreliable region.

4 Claims, 7 Drawing Sheets

(56) References Cited

U.S. PATENT DOCUMENTS

| | | | |
|---|---|---|---|
| 2007/0263902 A1* | 11/2007 | Higuchi | G05D 1/0246 382/104 |
| 2013/0300869 A1* | 11/2013 | Lu | B60R 1/00 348/148 |
| 2014/0010408 A1* | 1/2014 | Irie | G06T 7/0002 382/103 |
| 2017/0109590 A1* | 4/2017 | Gehrke | G06T 5/00 |
| 2019/0174029 A1 | 6/2019 | Mandai et al. | |

* cited by examiner

ADHERED SUBSTANCE DETECTION APPARATUS

CROSS REFERENCE TO RELATED APPLICATIONS

This application is based on and claims priority under 35 U.S.C. § 119 to Japanese Patent Application 2018-181204, filed on Sep. 27, 2018, the entire content of which is incorporated herein by reference.

TECHNICAL FIELD

This disclosure generally relates to an adhered substance detection apparatus.

BACKGROUND DISCUSSION

Conventionally, a system exists which causes a display apparatus to display an image based on captured image data captured by an imaging portion (camera) arranged at a vehicle and allows, for example, a driver to recognize circumstances around the vehicle, and/or which performs detection of presence or absence of an obstacle and/or detection of approach of an obstacle, on the basis of the image. In a case where a substance including dirt, for example, is adhered on an imaging surface (for example, a lens) of the imaging portion of such a system, the image may not be displayed appropriately, and/or the image processing and/or the detection processing which use the image may not be performed appropriately. Thus, a technique is suggested which controls and/or notifies changes of an adhesion state of adhered substance, and/or which notifies the state of adhesion to an external mobile terminal, for example (for example, JP2018-26671A which will be referred to as Patent reference 1 and JP5521990 which will be referred to as Patent reference 2).

In the case of the conventional system, when the adhered substance is detected, other processing apparatus using the image captured by the imaging portion, including a park assistance processing, an obstacle detection processing and an approaching object recognition processing, is configured such that the processing thereof is prohibited. That is, at the apparatus detecting the adhered substance, such processing is performed that gives restriction on the processing of other processing apparatus. However, in some cases, the adhered substance does not cover the entire imaging surface. Even in such a case, if other processing apparatus which functions in a normal manner (for example, the detection of an obstacle) is usable even slightly or partly, it will contribute to enhancement of convenience.

A need thus exists for an adhered substance detection apparatus which is not susceptible to the drawback mentioned above.

SUMMARY

According to an aspect of this disclosure, an adhered substance detection apparatus includes an obtaining portion configured to obtain captured image data outputted from an imaging portion configured to be mounted on a vehicle, and a detection portion configured to detect presence or absence of an adhered substance of each of plural regions of an imaging surface of the imaging portion in a case where the imaging surface is divided into the plural regions, on the basis of the captured image data. The adhered substance detection apparatus includes a judgement portion configured to distinguish a reliable region and an unreliable region from each other on the basis of the region in which the adhered substance is detected. In the reliable region, a reliability property of predetermined arithmetic processing performed by a processing apparatus with the use of the captured image data is kept to be equal to or greater than a predetermined value, and in the unreliable region, the reliability property is less than the predetermined value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be described hereunder. Configurations of the embodiment described below, and operation, result and effects obtained by the configurations are examples. The present disclosure can be realized with configurations other than the embodiment disclosed below, and at least one of the various effects based on the fundamental configuration and derivative effects can be obtained.

Figure 1:
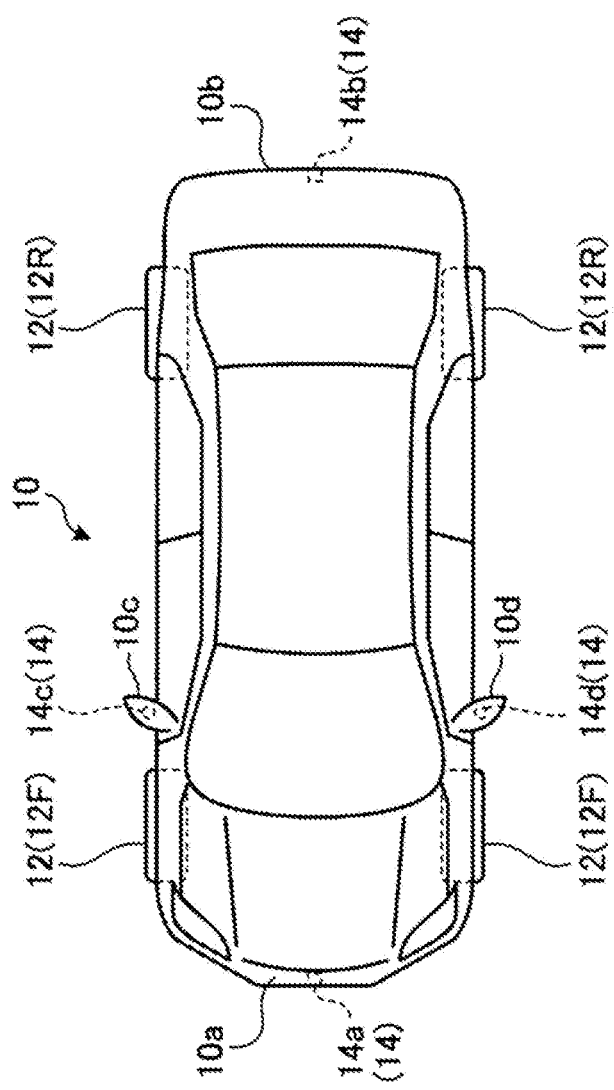
FIG. 1 is a schematic plan view illustrating an example of a vehicle on which an adhered substance detection apparatus of an embodiment disclosed here is mountable.

FIG. 1 is a schematic plan view of a vehicle 10 on which an adhered substance detection apparatus of the embodiment is mounted. For example, the vehicle 10 may be an automobile (an internal combustion engine vehicle) of which a drive source is an internal combustion engine (engine), an automobile (an electric vehicle, a fuel cell vehicle, for example) of which a drive source is an electric motor (motor), an automobile (a hybrid vehicle) including both the internal combustion engine and the electric motor, as the drive source. The vehicle 10 may be mounted with various kinds of transmission or speed changer, and/or various kinds of apparatus (systems, parts and components, for example) needed to actuate or drive the internal combustion engine and/or the electric motor. For example, a type, the number and/or a layout of the apparatuses related to the driving of a wheel 12 (a front wheel 12F, a rear wheel 12R) of the vehicle 10 may be set in various ways.

As illustrated in FIG. 1 in an exemplary manner, the vehicle 10 includes, for example, four imaging portions 14a, 14b, 14c, 14d serving as plural imaging portions 14. Each of the imaging portions 14 is a digital camera including therein an imaging element such as a Charge Coupled Device (CCD) or a CMOS Image Sensor (CIS), for example. Each of the imaging portions 14 is configured to output data of moving image (captured image data) at a predetermined frame rate. Each of the imaging portions 14 includes a wide-angle lens or a fisheye lens, and is configured to image or capture a range of 140 degrees to 220 degrees in the horizontal direction, for example. An optical axis of each of the imaging portions 14 (14a to 14d) arranged at an outer periphery of the vehicle 10 may be set obliquely downwards, for example. Accordingly, the imaging portions 14 (14a to 14d) image or capture a surrounding environment outside the vehicle 10 sequentially and output the captured surrounding environment as the captured image data. The surrounding environment outside the vehicle 10 may include, for example, a road surface on which the vehicle 10 is movable, a mark or sign (an arrow, a partition line, a parking frame indicating a parking space and/or a lane-dividing line, for example) provided on the road surface, and/or an object (an obstacle including a pedestrian and/or other vehicle, for example).

For example, the imaging portion 14a is provided at a front side of the vehicle 10, that is, at an end portion of the vehicle 10 in the front in a vehicle front and rear direction and a substantially center in a vehicle width direction, for example, at a front bumper 10a or a front grill. The imaging portion 14a may capture a front image including a front end portion of the vehicle 10 (the front bumper 10a, for example). For example, the imaging portion 14b is provided at a rear side of the vehicle 10, that is, at an end portion of the vehicle 10 in the rear in the vehicle front and rear direction at a substantially center in the vehicle width direction, for example, above the rear bumper 10b. The imaging portion 14b may capture a rear region including a rear end portion of the vehicle 10 (the rear bumper 10b, for example). For example, the imaging portion 14c is provided at a right-side end portion of the vehicle 10, for example, at a right-side door mirror 10c and may capture a right-side image including a region that is mainly on the right side relative to the vehicle 10 (a region from a right front to a right rear, for example). For example, the imaging portion 14d is provided at a left-side end portion of the vehicle 10, for example, at a left-side door mirror 10d and may capture a left-side image including a region that is mainly on the left side relative to the vehicle 10 (a region from a left front to a left rear, for example).

On the basis of the captured image data obtained at the imaging portions 14a to 14d, arithmetic processing and/or image processing are performed, thereby generating an image including a wider field of view and/or generating a virtual image (a perspective image (a plane image), a side-view image and/or a front-view image) corresponding to a view of the vehicle 10 viewed from above, front and/or side, for example. The captured image data (images) imaged by the respective imaging portions 14a to 14d may include overlap regions overlapped with each other. For example, a right-side end portion of the captured image data captured by the imaging portion 14a and a front-side end portion of the captured image data captured by the imaging portion 14c overlap each other. When the two images are connected to each other (synthesized or composed), blend processing may be performed by which a predefined percentage (for example, a %) of each of the captured image data of the front image and the captured image data of the right side image are used to synthesize the image. By performing the blend processing, the image is synthesized such that the front image and the right side image change gradually and that a boundary line generated by difference in brightness and/or colors becomes less noticeable. In a similar manner, by performing the blend processing on the front image and the left side image, on the left side image and the rear image, on the rear image and the right side image, the boundary line becomes less noticeable in the entire surrounding image that is synthesized.

The captured image data obtained at each of the imaging portions 14 is displayed on a display apparatus provided at a vehicle cabin so that circumstances around the vehicle 10 is provided to a user including a driver, for example, as explained above. As will be described below, the captured image data is provided also to a processing apparatus (processing portion) performing various detection and/or sensing by the image processing, and may be used to control the vehicle 10.

Figure 2:
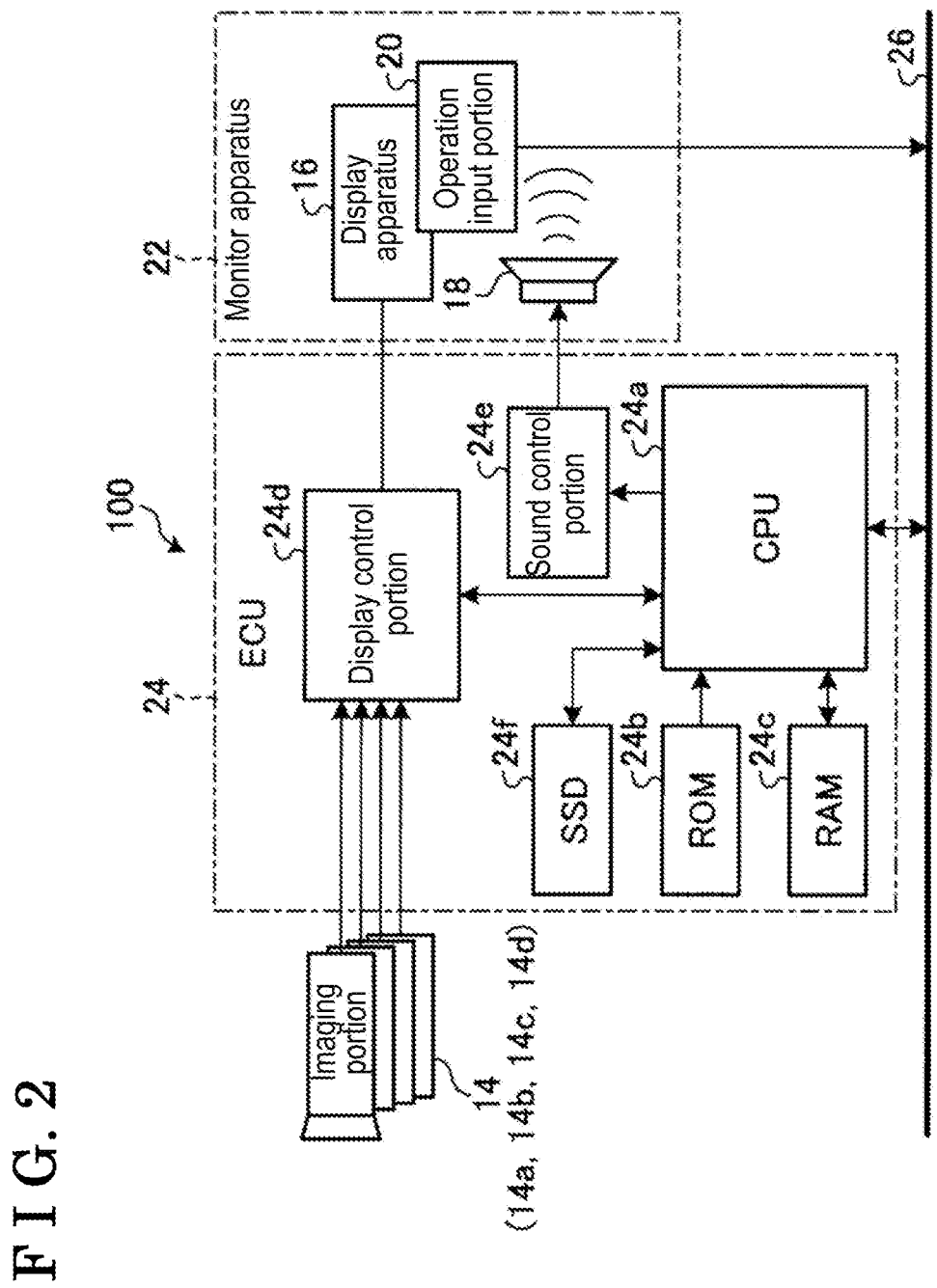
FIG. 2 is an exemplary block diagram of a configuration of a vehicle control system including the adhered substance detection apparatus of the embodiment.

FIG. 2 is an exemplary block diagram of a configuration of a vehicle control system 100 including the adhered substance detection apparatus to be mounted on the vehicle 10. A display apparatus 16 and a sound output apparatus 18 are provided inside the vehicle cabin of the vehicle 10. The display apparatus 16 is a liquid crystal display (LCD) or an organic electroluminescent display (OELD), for example. The sound output apparatus 18 is a loud speaker, for example. The display apparatus 16 is covered with a transparent operation input portion 20, including, a touch panel. The user (the driver, for example) may visually recognize the image displayed on a display screen of the display apparatus 16 via the operation input portion 20. The user may perform an operation input by operating the operation input portion 20, for example, by touching, pushing and/or moving the operation input portion 20 with his or her finger at a position corresponding to the image displayed on the display screen of the display apparatus 16. For example, the display apparatus 16, the sound output apparatus 18, the operation input portion 20 and so forth are provided at a monitor apparatus 22. The monitor apparatus 22 is arranged at a dashboard of the vehicle 10 to be positioned at a central portion in the vehicle width direction, that is, in the right-and-left direction, for example. The monitor apparatus 22 may include an operation input portion including a switch, a dial, a joystick, a push button, for example. The monitor apparatus 22 may be also used as a navigation system and/or an audio system, for example.

As illustrated in FIG. 2, the vehicle control system 100 (including the adhered substance detection apparatus) includes an electronic control unit (ECU) 24, in addition to the imaging portions 14 (14a to 14d) and the monitor apparatus 22. At the vehicle control system 100, for example, the ECU 24 and the monitor apparatus 22 are electrically connected via an in-vehicle network 26 serving as telecommunications line. The in-vehicle network 26 is configured as a controller area network (CAN), for example. The ECU 24 may perform control of various systems by sending control signals via the in-vehicle network 26. For example, the ECU 24 may also receive operation signals of the operation input portion 20 and/or various switches, and/or detection signals of various sensors, via the in-vehicle network 26. Various systems (a steering system, a brake system, a drive system, for example) and/or various sensors (a steering sensor, a wheel speed sensor, an accelerator sensor, for example) which are for running the vehicle 10 are connected to the in-vehicle network 26, however, the explanations of the systems and sensors will be omitted.

The ECU 24 sends, to the monitor apparatus 22, data related to the surrounding image and/or sound which are generated on the basis of the captured image data obtained from the imaging portions 14, for example. The ECU 24 includes a central processing unit (CPU) 24a, a read only memory (ROM) 24b, a random access memory (RAM) 24c, a display control portion 24d, a sound control portion 24e and an SSD (solid state drive, flash memory) 24f, for example.

Figure 3:
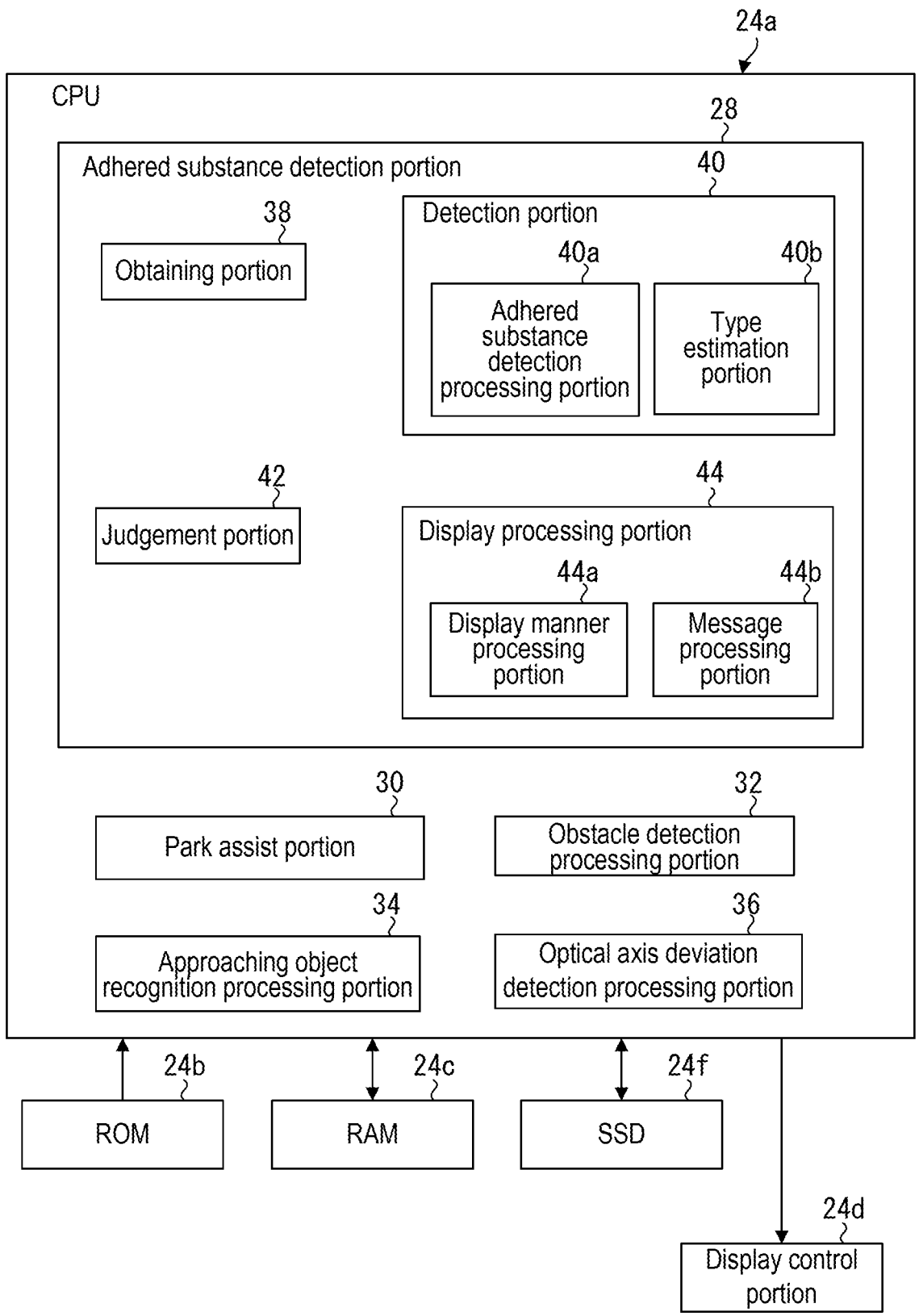
FIG. 3 is an exemplary block diagram illustrating a configuration of a CPU where each module, including the adhered substance detection apparatus (adhered substance detection portion) of the embodiment, is realized.

The CPU 24a reads program stored (installed) in a nonvolatile storage including the ROM 24b and performs or executes arithmetic processing in accordance with the program. The ROM 24b stores each program and parameters needed or used to perform each program, for example. The CPU 24a includes various modules which for example are illustrated in FIG. 3, and performs adhered substance detection processing of the imaging portions 14 and/or processing related to the image displayed on the display apparatus 16. For example, the CPU 24a performs the arithmetic processing and/or the image processing to the captured image data captured by the imaging portions 14, and detects an adhesion position (adhesion region) of the adhered substance on an imaging surface of each of the imaging portions 14, estimates a type of the adhered substance, and switches the display according to the adhesion position of the adhered substance. The CPU 24a distinguishes a reliable region and an unreliable region from each other on the basis of the adhesion position of the adhered substance. In the reliable region, a reliability property of the arithmetic processing (imaging processing and/or recognition processing) performed at other processing apparatus (processing portion, system) by using the captured image data is kept equal to or greater than a predetermined value. In the unreliable region, the reliability property is less than the predetermined value. The CPU 24a may notify the user about a judgement result of the distinguishing via the display apparatus 16, for example. The CPU 24a includes modules that realize, for example, a park assist processing, an obstacle detection processing and an approaching object recognition processing for controlling the vehicle 10, in addition to the adhered substance detection apparatus. The detailed explanation of the CPU 24a will be made later.

The RAM 24c temporarily stores various data used for the arithmetic processing at the CPU 24a. Out of the arithmetic processing performed at the ECU 24, the display control portion 24d mainly performs the image composition of the image data displayed at the display apparatus 16, for example. Out of the arithmetic processing performed at the ECU 24, the sound control portion 24e mainly performs the processing of the sound data outputted at the sound output portion 18, for example. The SSD 24f is a rewritable nonvolatile storage and maintains data even in a case where a power switch of the ECU 24 is turned off. For example, the CPU 24a, the ROM 24b and the RAM 24c may be integrated in the same package. The ECU 24 may include a configuration in which other logic operation processor and/or logic circuit including a digital signal processor (DSP), instead of the CPU 24a. Instead of the SSD 24f, a hard disk drive (HDD) may be provided. The SSD 24f and/or the HDD may be provided separately from the ECU 24.

In the embodiment, the hardware and the software (control program) work together, and thus the ECU 24 manages image generating processing of the image to be displayed at the display apparatus 16 on the basis of the adhered substance detection processing on the imaging surface of the imaging portion 14 and the result of the detection. By performing, for example, the image processing relative to the captured image data captured by the imaging portions 14, the ECU 24 detects whether or not an adhered substance is adhered to any of plural divided regions of the imaging surface. In a case where the adhered substance is detected, the ECU 24 distinguishes the reliable region in which the reliability property of the arithmetic processing at the processing apparatus performing the predetermined arithmetic processing with the use of the captured image data is maintained to be equal to or greater than the predetermined value, and the unreliable region in which the reliability property is less than the predetermined value, in accordance with the positon of the adhesion region of the detected adhered substance. That is, even in a case where a region in which the reliability of the arithmetic processing is decreased exists, the ECU 24 allows the user to recognize that the arithmetic processing of the processing apparatus (processing portion) is valid in a limited region in which the reliability is assured and the ECU 24 provides useful or helpful information to the processing apparatus (processing portion) and/or the user as much as possible. By indicating the unreliable region to the user, the ECU 24 makes the user strongly or acutely aware that the adhered substance is adhered and the ECU 24 helps the user to recognize that the processing apparatus (processing portion) can be used in the limited region with care or with caution.

FIG. 3 is an exemplary block diagram of a configuration of the CPU 24a included in the ECU 24. As the aforementioned adhesion detection portion, the CPU 24a includes the various modules that perform the detection processing of the region in which the adhered substance is adhered, the judgement processing for distinguishing the reliable region and the unreliable region in a case where the adhered substance is detected, and the display processing for presenting the judgement result to the user, for example. The reliable region and the unreliable region are for the arithmetic processing of the processing apparatus (processing portion) in which the captured image date is used. In addition to the adhered substance detection apparatus, the ECU 24 includes the various modules that realize the processing apparatus performing the predetermined arithmetic processing by using the captured image data. The CPU 24a reads the program installed and stored in the storage including the ROM 24b and executes the program, and thus the various modules are realized. For example, as illustrated in FIG. 3, the CPU 24a realizes an adhered substance detection portion 28, a park assist portion 30, an obstacle detection processing portion 32, an approaching object recognition processing portion 34 and an optical axis deviation detection processing portion 36, for example. The park assist portion 30, the obstacle detection processing portion 32, the approaching object recognition processing portion 34 and the optical axis deviation detection processing portion 36, for example, are examples of the processing apparatus (processing portion) which performs the predetermined arithmetic processing with the use of the captured image data that the imaging portions 14 capture. Accordingly, the CPU 24a may realize various processing apparatuses (processing portions) other than the above-stated example. These processing apparatuses may be realized at a CPU which is different from the CPU 24a or a different ECU, or may be configured as exclusive hardware. The park assist portion 30 performs processing of obtaining a travel route guiding the vehicle 10 to a target parking region (a parking frame) that is set on the basis of the captured image data obtained by each of the imaging portions 14 and of guiding the vehicle 10 through autonomous running or manual running. The obstacle detection processing portion 32 performs processing of, for example, detecting an obstacle that might exist in the surroundings of the vehicle 10 with the use of, for example, pattern matching processing on the basis of the captured image data obtained by each of the imaging portions 14. In a similar manner to the obstacle detection processing portion 32, the approaching object recognition processing portion 34 detects, for example, an obstacle that might exist in the surroundings of the vehicle 10 with the use of, for example, pattern matching processing on the basis of the captured image data obtained by each of the imaging portions 14 and further tracks the obstacle, and thus performs processing of recognizing the obstacle. For example, the optical axis deviation detection processing portion 36 performs processing of an optical axis deviation detection by applying headlight at a wall surface for inspection, causing the imaging portion 14a to capture an image of the wall surface, and then analyzing the captured image data. Known techniques are applicable to the park assist portion 30, the obstacle detection processing portion 32, the approaching object recognition processing portion 34 and the optical axis deviation detection processing portion 36, for example, and therefore explanation of detailed structure and/or operation thereof will be omitted in the embodiment.

For example, the adhered substance detection portion 28 includes an obtaining portion 38, a detection portion 40, a judgement portion 42 and a display processing portion 44, which serve as detailed module for realizing the detection processing related to the adhered substance and the display processing on the basis of the detection result.

The obtaining portion 38 sequentially obtains the captured image data captured at each of the imaging portions 14. In the embodiment, for example, each of the imaging portions 14 may attach an identification code of the imaging portion 14 to the captured image data captured at the imaging portion 14, and then may output the image data with the identification code to the obtaining portion 38. Or, at the obtaining portion 38, an identification code identifying an output source may be attached to each datum of the captured image data captured at the imaging portions 14. The obtaining portion 38 may perform a distortion correction and/or a brightness correction on the captured image data captured at each of the imaging portions 14, thereby to convert a state of the data into a state in which the adhered substance can be easily detected.

For example, the detection portion 40 includes an adhered substance detection processing portion 40a and a type estimation portion 40b, as detailed module.

For example, the adhered substance detection processing portion 40a detects presence or absence of the adhered substance on the imaging surface by performing imaging processing, for example, a known difference detection processing, on each of the plural captured image data (images) captured by the imaging portions 14 in a chronological order with a predetermined time interval while the vehicle 10 is running, and then detecting an immobile element in the images. In the images captured at the imaging portion 14a mounted on the vehicle 10 that is running, contents of the images change from moment to moment. If an adhered substance including a mad splash and/or a water drop is adhered to the imaging surface (for example, lens), however, the adhesion portion stays at the same position in the captured image data (images) captured in the chronological order. On the other hand, at the portion to which an adhered substance is not adhered, the contents of the display changes from moment to moment. Accordingly, by obtaining a difference between at least two images which are imaged with a predetermined time interval (for example, 0.5 seconds), it can be judged that the adhered substance is adhered to the portion of which the display contents do not change (except for a portion of the vehicle body which is captured in the image). In this case, a judgement threshold value may be set for judging an adhered substance. Thus, in a case of a slight dirt (adhesion) such as, for example, a small adhered substance which does not substantially hide or block the image contents and/or a thin water drop which is transparent and does not hardly causes light reflection and/or light refraction, it may be judged as "an adhered substance is absent". The judgement threshold value may be determined in advance via, for example, a test or an experiment, for each processing apparatus (each processing portion, the park assist portion 30, for example) that uses the captured image data, and may be stored in the ROM 24b, for example. The judgement threshold value may be the same among the processing apparatuses or may be set to be different from one another for the processing apparatuses.

Figure 4:
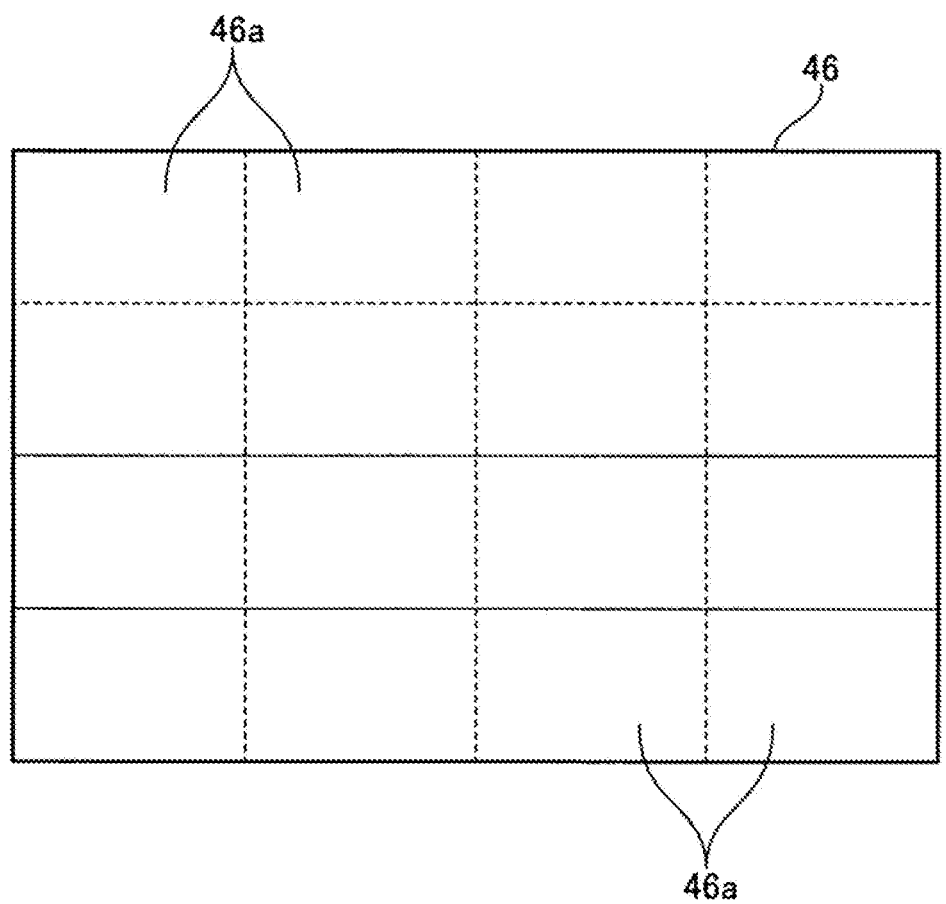
FIG. 4 is an exemplary and schematic view illustrating division of regions of an imaging surface of an imaging portion of the adhered substance detection apparatus of the embodiment.

As illustrated in FIG. 4, the imaging surface 46 of the imaging portion 14 is divided into plural regions 46a, and the adhered substance detection processing portion 40a can judge which of the plural regions 46a the detected adhered substance is adhered to. In a case of FIG. 4, for a purpose of simplifying the drawing, the imaging surface 46 is divided into sixteen regions 46a, that is, the four regions 46a in a vertical column and the four regions 46a in a horizontal row (vertically×horizontally=4×4). However, the imaging surface 46 is actually divided into larger number of regions in more detailed manner, for example, ten to twenty regions in a horizontal row and ten to twenty regions in a vertical column such that the adhesion position of the adhered substance is detected more accurately.

As other adhered substance detection technique, detection that uses spatial frequency is known, for example. FFT (fourier transform) processing is performed on the images (for example, the images of the respective regions 46a) captured by the imaging portions 14 and the images are transformed to indication of frequency domain. In this case, if an adhered substance is adhered to the imaging surface (for example, lens) of the imaging portion 14, the light is blurred and thus an edge of an object appearing in the image is blurred. That is, frequency part of a high frequency range becomes attenuated or damped. In a case where the above-explained phenomenon is occurring, it can be judged that the adhered substance is adhered to the imaging surface and the region 46a to which the adhered substance is adhered can be identified. In this case, the detection of the adhered substance can be performed with one image captured by one of the imaging portions 14a, and the adhered substance detection can be performed with the use of an image taken when the vehicle 10 is stopped and/or is running at an extremely low speed. The detection of the adhered substance is not limited to the above-explained techniques and a known technique may be used. A detection efficiency may be enhanced by allowing the detection portion 40 to learn whether or not an adhered substance is adhered on the basis a detection result in the past.

In a case where the adhered substance is detected by the adhered substance detection processing portion 40a, the type estimation portion 40b estimates a type of the adhered substance that is adhered. For example, it can be estimated that the adhered substance is an opaque substance that does not transmit the light easily, for example, "a mad splash" in a case where a brightness or a transmittance of the region 46a which is judged to have the adhered substance adhered thereto is lower than a predetermined threshold value (the brightness is low or the transmittance is low). In contrast, it can be estimated that the adhered substance is a substance that transmits the light easily and includes transparency, for example, "a water drop" in a case where the brightness or the transmittance of the region 46a which is judged to have the adhered substance adhered thereto is equal to or higher than a predetermined threshold value (the brightness is high or the transmittance is high). The type estimation portion 40b may estimate that the adhered substance is "a water drop" including fluidity or flowability in a case where the substance judged as the adhered substance moves as time passes. In contrast, the type estimation portion 40b may estimate that the adhered substance is "a mad splash" that does not include fluidity or flowability in a case where the substance judged as the adhered substance does not move even with the lapse of time.

In a case where the adhered substance is detected by the adhered substance detection processing portion 40a, the judgement portion 42 distinguishes "the reliable region" in which the reliability property of the arithmetic processing at the processing apparatus (the park assist portion 30 and/or the obstacle detection processing portion 32, for example) performing the predetermined arithmetic processing with the use of the captured image data is kept to be equal to or greater than the predetermined value and "the unreliable region" in which the reliability property is less than the predetermined value from each other in accordance with the position (the region 46a) of the adhered substance. "The reliable region" is a region corresponding to the region 46a, of the imaging surface of the imaging portion 14, which has been judged that an adhered substance is not adhered thereto. By performing the arithmetic processing (white-line detection processing, for example) relative to "the reliable region", in a case where a white line for example is captured in the captured image data (partial data) of the region 46a of the reliable region, the white line can be detected in a normal manner in a state where the reliability property that is equal to or greater than the predetermined value is ensured. On the other hand, "the unreliable region" is a region corresponding to the region 46a, of the imaging surface of the imaging portion 14, which has been judged that the adhered substance is adhered thereto. In a case where the arithmetic processing (the white-line detection processing, for example) is performed relative to "the unreliable region", even if, for example, the white line is captured in the captured image data (the partial data) of the region 46a of the unreliable region, it can be considered that the white line is hidden by or covered with the adhered substance and thus is not recognized. That is, it can be considered that the detection of which the reliability property is maintained to be equal to or greater than the predetermined value cannot be performed (the reliability property of the detection is less than the predetermined value).

For example, the display processing portion 44 includes detailed module including a display manner processing portion 44a and a message processing portion 44b, for causing the display apparatus 16 to display the reliable region and the unreliable region in such a manner that the reliable region and the unreliable region can be discerned or distinguished from each other, on the basis of the judgement result of the judgement portion 42.

Figure 5:
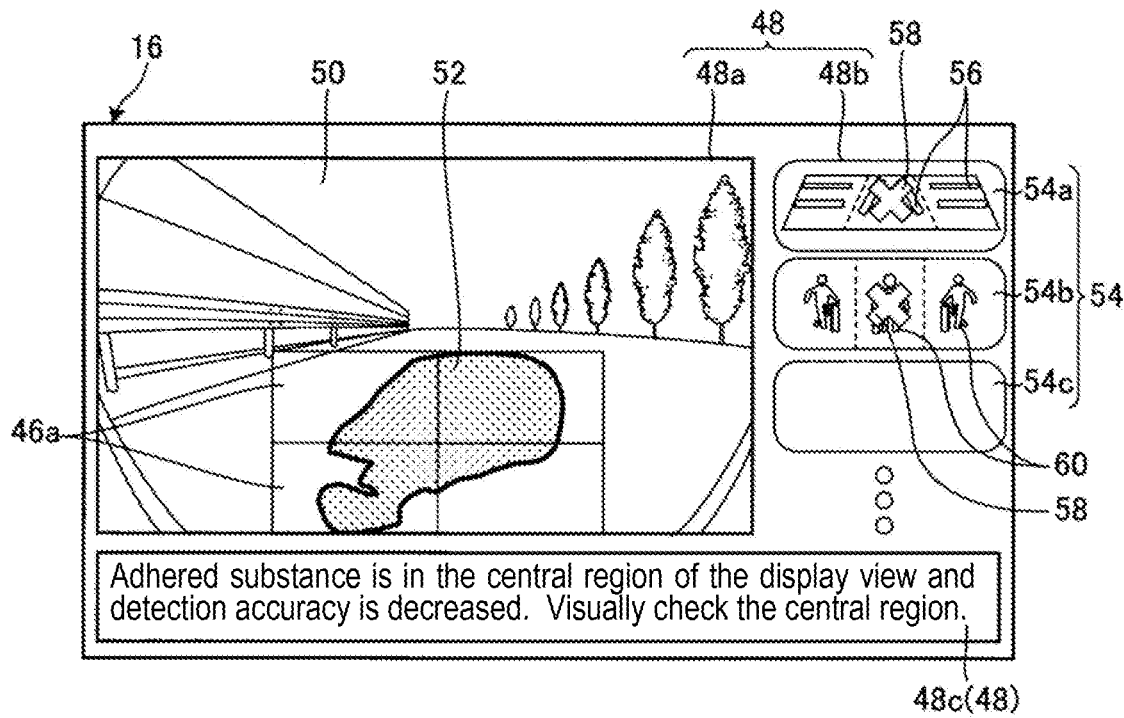
FIG. 5 is an exemplary and schematic view illustrating an example of a display apparatus on which a reliable region and an unreliable region of arithmetic processing are displayed by the adhered substance detection apparatus of the embodiment.
Figure 6:
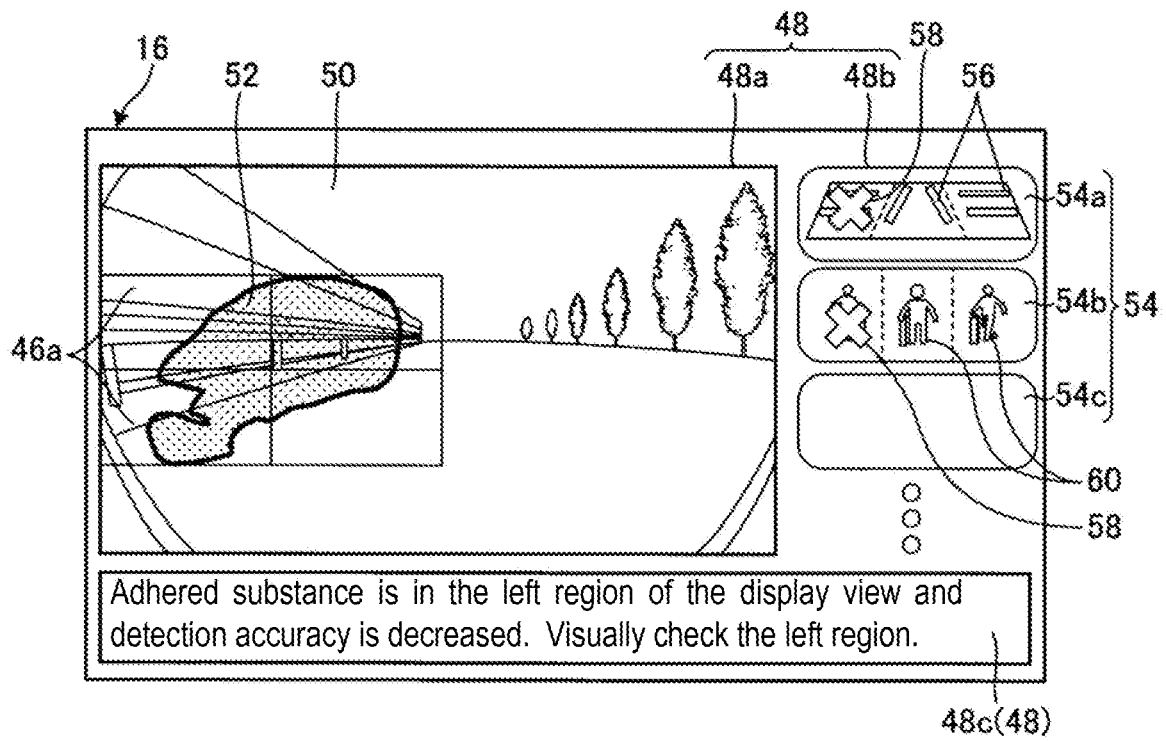
FIG. 6 is an exemplary and schematic view illustrating another example of the display apparatus on which the reliable region and the unreliable region of the arithmetic processing are displayed by the adhered substance detection apparatus of the embodiment.

As illustrated in FIGS. 5 and 6, the display manner processing portion 44a allows a display region 48 of the display apparatus 16 to be displayed in a two-division structure including a first display region 48a and a second display region 48b, for example. For example, an actual image 50 (an image on which the distortion correction and/or the brightness correction has been performed, for example) imaged by the imaging portion 14a and indicating the circumstances of the front side relative to the vehicle 10 is displayed in the first display region 48a. Illustrated in FIG. 5 is an example in which an adhered substance 52 is adhered to a central region of the first display region 48a. Illustrated in FIG. 6 is an example in which the adhered substance (adhered object) 52 is adhered to a left region of the first display region 48a. As a result, the user (the driver, for example) is allowed to intuitively understand which region (position) of the imaging surface of the imaging portion 14a the adhered substance 52 is adhered to. As illustrated in FIGS. 5 and 6, the region or regions 46a (a region frame) corresponding to the position at which the adhered substance 52 exist may be displayed.

For example, a function display view 54 is displayed in the second display region 48b. The function display view 54 allows the user to easily imagine what is being recognized (detected, extracted) in the processing apparatus (the park assist portion 30, the obstacle detection processing portion 32, the approaching object recognition processing portion 34, for example) that is currently performing the arithmetic processing. The function display view 54 performs such display that clearly indicates the unreliable region in which the reliability property of the recognition (detection, extraction) of the processing apparatus is decreased due to the adhesion of the adhered substance 52 and the reliable region in which the reliability property is maintained as normal.

For example, in a case where the processing of the park assist portion 30 is being performed, the park assist portion 30 may detect the white line including a center line, the partition line and/or the parking frame on the basis of the captured image data captured by the imaging portions 14, in order to obtain the target parking region and/or a guiding route. A white-line detection function display view 54a, which indicates that a function of detecting the white line is being performed or is running, is indicated in the second display region 48b. In correspondence to the regions 46a which are displayed in the first display region 48a and to which the adhered substance 52 is adhered, a mark 58 including, for example, a cross (X) mark, is indicated in the white-line detection function display view 54a. The mark 58 including, for example, the cross (X) mark, indicates that the reliable recognition is impossible to be performed relative to the white line 56 in the central region. In contrast, the mark 58 is not provided in the right and left regions corresponding to the regions to which the adhered substance 52 is not adhered. That is, the white-line detection function display view 54a shows that the regions, where the white-line recognition is possible in a state where the reliability property is maintained, exist.

As described above, in a case where the adhered substance 52 exists in the central region of the actual image 50, the reliability property of the white-line detection with the use of the central region of the captured image data imaged by the imaging portion 14a is low or the detection processing is impossible to be performed. In other words, in a case of FIG. 5, the white-line detection can be performed as is normally done in the right and left regions. As a result, even in a case where the adhered substance 52 is adhered to the imaging surface of the imaging portion 14a, the park assist portion 30 is able to perform, although in a limited region, the white-line detection in a state where the reliability property is maintained, and the useful information (information on the white line, for example) can be provided to the park assist portion 30 and/or the user.

In a case where the processing of the obstacle detection processing portion 32 is being performed, for example, a pedestrian, other vehicle and/or a structure that might possibly exist around the vehicle 10 might be detected by performing the pattern matching processing relative to the image based on the captured image data imaged by the imaging portion 14. In this case, in the second display region 48b, an obstacle detection function display view 54b indicating that the detection function of the obstacle (the pedestrian, other vehicle, the structure, for example) is being performed is displayed. In the obstacle detection function display view 54b, the mark 58 indicating that the reliable detection of an obstacle 60 (a pedestrian mark, for example) in the central region is impossible is displayed in correspondence to the regions 46a which are displayed in the first display region 48a and to which the adhered substance 52 is adhered, the mark 58 includes, for example, the cross (X) mark or symbol. The mark 58 is not provided in the right and left regions corresponding to the regions to which the adhered substance 52 is not adhered. That is, the obstacle detection function display view 54b displays that the regions, in which the obstacle recognition can be performed in a state where the reliability property is maintained, exist.

Similarly, in the second display region 48b of FIG. 6, the white-line detection function display view 54a and the obstacle detection function display view 54b are displayed, and the marks 58 indicating that the reliable recognition of the white line 56 and/or the obstacle 60 in the left region is impossible to be performed is displayed in correspondence to the regions 46a which are displayed in the first display region 48a and to which the adhered substance 52 is adhered, the mark 58 includes, for example, the cross (X) mark. The mark 58 is not provided in the central region and the right region that correspond to the regions to which the adhered substance 52 is not adhered. That is, it is indicated that the white-line recognition and/or the obstacle recognition are possible to be performed in a state where the reliability property is maintained.

In FIGS. 5 and 6, a function display view 54c provides a blank display. In a case where the arithmetic processing of other processing portion on the basis of the captured image data captured by the imaging portions 14 is being performed, the image indicating the function of the processing is displayed in the function display view 54c and the mark 58 is also indicated in the function display view 54c if the reliability property of the recognition is less than the predetermined value due to the existence of the adhered substance 52. For example, the white-line detection function display view 54a, the obstacle detection function display view 54b, and the like may be displayed at fixed positions or may be displayed in the order in which the arithmetic processings are performed. In a case where the above-described views are displayed at the fixed positions, the display positions easily allow the user to intuitively recognize the contents of the display.

As described above, the function display view 54 is displayed in the second display region 48b, and thus the user is notified to recognize that the reliable region and the unreliable region exist due to the adhesion of the adhered substance 52. That is, the user are allowed to easily recognize that the processing portions including the park assist portion 30 and/or the obstacle detection processing portion 32 are partially usable, instead of that these processing portions are totally unusable.

In the embodiment, other processing apparatus (processing portion) operates and performs the arithmetic processing relative also to the region corresponding to the region in which the adhered substance 52 has been detected, without omitting or skipping the arithmetic processing. That is, other processing apparatus (processing portion) is not made to omit the processing (is not given functional restriction) on the basis of the adhesion of the adhered substance 52, and accordingly operates without omission of the processing.

In a case of the function display view 54 illustrated in each of FIGS. 5 and 6, a region is divided into three portions in a lateral direction, however, the region may be divided in a more detailed manner. For example, the region may be further divided into two portions in an up and down direction so as to be displayed with the six divided portions in total.

The display manner processing portion 44a may allow either one of the first display region 48a and the second display region 48b to be displayed. For example, a display manner of the display apparatus 16 may be changed on the basis of operation of the operation input portion 20 made by the user. In this case, the first display region 48a or the second display region 48b is allowed to be displayed in an enlarged manner in the display region of the display apparatus 16, which is a limited region, thereby contributing to enhancement in recognizability of the user. When only the first display region 48a is displayed, a cross "X" mark similar to the mark 58, for example, may be provided in the region to which the adhered substance 52 is adhered and then which is judged as the unreliable region.

The display manner processing portion 44a may change a manner of displaying or showing the adhered substance 52 in the actual image 50, on the basis of the type of the adhered substance 52 estimated by the type estimation portion 40b. For example, in a case where the type of the adhered substance 52 is estimated to be, for example, "the mad splash" that substantially hides the contents of the image, the adhered substance 52 may be displayed with a dark brown-based display color or colors that easily suggests or gives an idea of "the mad splash". In contrast, in a case where the type of the adhered substance 52 is estimated to be, for example, "the water drop" that transmits the contents of the image to some extent, the adhered substance 52 may be displayed with a light blue-based display color or colors that easily suggests or gives an idea of "the water drop". As described above, by determining the display manner (the display color, for example) of the adhered substance 52 in the actual image 50 depending on the type of the adhered substance 52, the user is allowed to easily and intuitively recognize the type of the adhered substance 52, and thus the user can easily determine the timing of removal of the adhered substance 52. For example, in a case where the adhered substance 52 is the water drop, the user may determine to wait and see because the water drop might be removed by, for example, wind pressure during the running of the vehicle. In contrast, in a case where the adhered substance 52 is the mad splash, the user is caused to make a determination that it is ideal that the mad splash is removed as soon as possible because it will be solidified as time passes. By facilitating the recognition of the type of the adhered substance 52, an entertainment aspect of the display may be enhanced, which may contribute to enhancement of a value of a commodity.

In the actual image 50, the display manner processing portion 44a may display the region 46a in which the adhered substance 52 exists with such a color or colors that includes a transmittance manner that is easily distinguishable from the other regions. For example, the region 46a in which the adhered substance 52 exists may be displayed with light or pale "red" and/or light or pale "yellow". The region 46a in which the adhered substance 52 exists may be displayed in a blinking or flashing manner and/or the brightness thereof may be changed. For example, the determination of the display manner may be the determination of a manner for indicating a region in which the adhered substance exists by using the image based on the captured image data and a manner for simply indicating the region in which the adhered substance exists by using, for example, a mark. In a case where the region in which the adhered substance exists is displayed with the use of the image based on the captured image, the display manner (the display color, for example) of the adhered substance superimposed on the image may be determined in accordance with the type of the adhered substance.

The message processing portion 44b displays, in a message region 48c of the display region 48, a notification message corresponding to the unreliable region. For example, in a case where the adhered substance 52 is adhered to the central region of the imaging surface as illustrated in FIG. 5, the message including "Adhered substance is in the central region of the display screen and the detection accuracy of the region is decreased. Visually check the central region." may be displayed. For example, in a case where the adhered substance 52 is adhered in the left region of the imaging surface as illustrated in FIG. 6, the message including "Adhered substance is in the left region of the display screen and detection accuracy of the region is decreased. Visually check the left region." may be displayed. By displaying the above-described messages, the user is easily made to understand that the unreliable region exists in the processing apparatus (processing portion) and/or the user needs to be aware of the presence of the unreliable region during the arithmetic processing, for example. The adhered substance detection portion 28 may output a sound or audio message including a similar content to the above-described messages via the sound output apparatus 18. The message processing portion 44b may also display a message corresponding to the contents displayed in the function display view 54, including "Reliability of the white-line detection in the central region is decreased." and/or "Reliability of the obstacle (pedestrian) detection in the central region is decreased".

Figure 7:
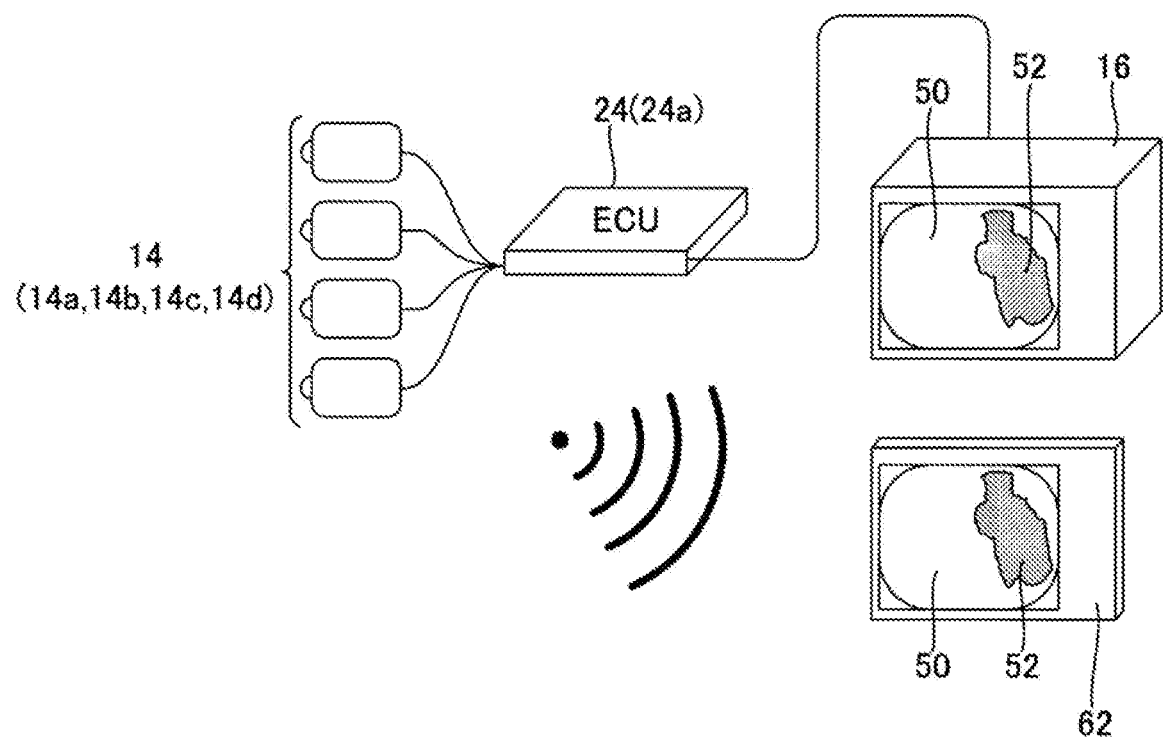
FIG. 7 is a schematic view illustrating an example of output of a detection result of the adhered substance according to the adhered substance detection apparatus of the embodiment.

FIG. 7 is a schematic view illustrating an example of output of the detection result of the adhered substance 52 by the display processing portion 44. As described above, the CPU 24a of the ECU 24 detects, for example, the adhesion region and/or the type of the adhered substance 52 on the basis of the image obtained at the imaging portions 14 (14a to 14d), and causes the display apparatus 16 to display the actual image 50 and/or the function display view 54 in a state where the adhered substance 52 is adhered. In another embodiment, the CPU 24a of the ECU 24 may cause an external display apparatus 62 (a mobile terminal and/or a personal computer, for example), which the user can check outside the vehicle 10 by using wireless communication, to display the actual image 50 indicating the adhesion region of the adhered substance 52, the type of the adhered substance 52 and/or the like, or the function display view 54, for example. By displaying the actual image 50 indicating the adhesion region of the adhered substance 52 and/or the type of the adhered substance 52, or the function display view 54 on the external display apparatus 62, operation efficiency of maintenance such as a removal operation of the adhered substance 52 may be enhanced, for example. By allowing the user to recognize the actual image 50 indicating the type of the adhered substance 52 on the external display apparatus 62, the entertainment aspect of the display can be enhanced, thereby contributing to enhancement of a commodity value.

The module configuration illustrated in FIG. 3 is an example and the functions can be appropriately divided and/or integrated as long as a similar processing is performed.

Figure 8:
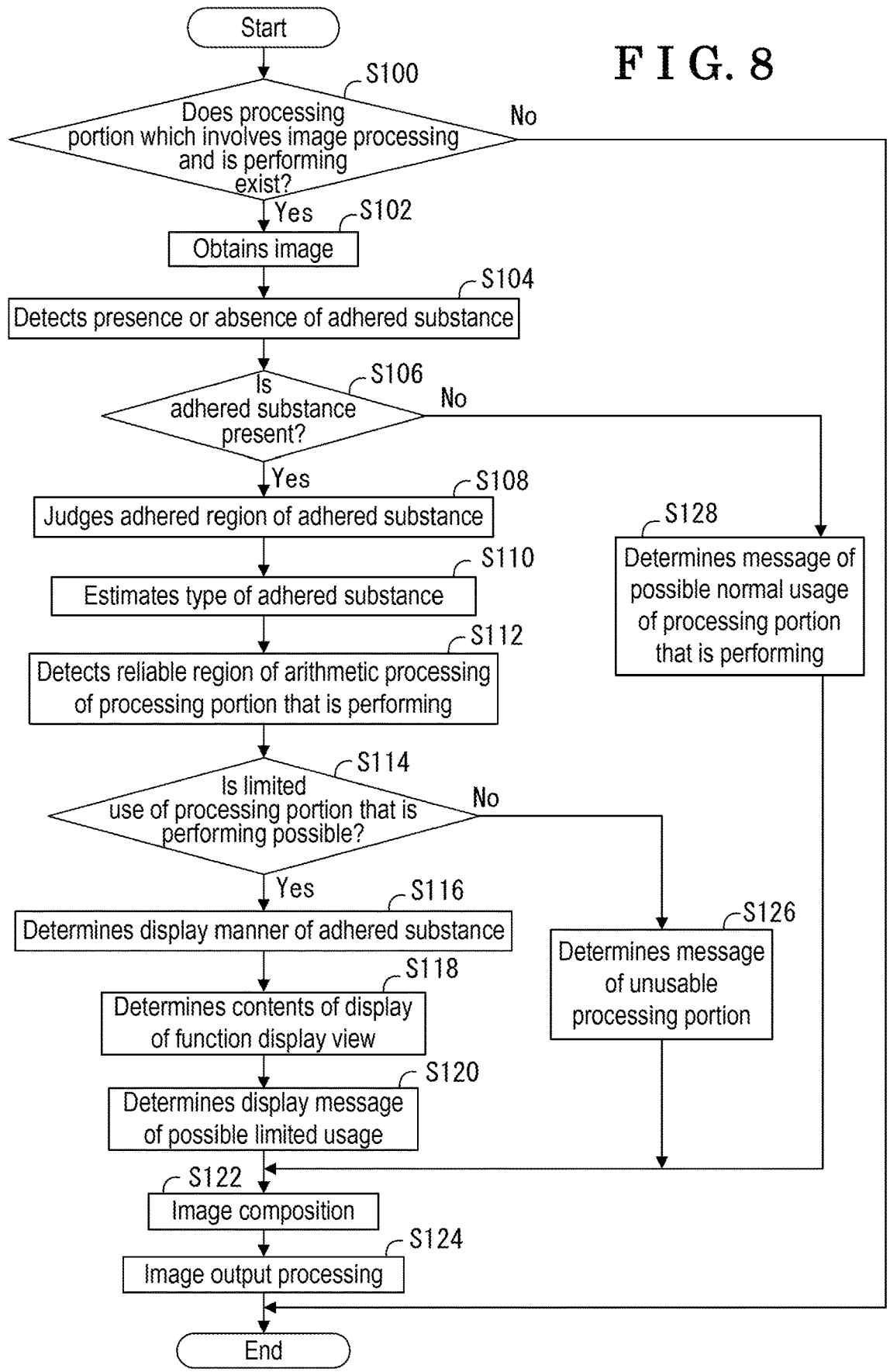
FIG. 8 is a flowchart illustrating an example of a process flow according to the adhered substance detection apparatus of the embodiment.

An example of a process flow of the adhered substance detection processing performed by the adhered substance detection portion 28 including the above-described configuration will be explained with reference to the flowchart illustrated in FIG. 8.

While an electric power supply of the vehicle 10 is ON, regardless of whether or not the vehicle is running, the CPU 24a always monitors whether or not the processing portion (the park assist portion 30, for example) involving the image processing of the captured image data captured by each of the imaging portions 14 is performing the processing (that is, being in operation), exists or not (S100). In a case where the processing portion (the park assist portion 30, for example) which involves the image processing and is performing the processing does not exist (No at S100), the flow is ended once.

In a case where the processing portion (the park assist portion 30, for example) which involves the image processing and is performing the processing exists (Yes at S100), the obtaining portion 38 sequentially obtains the captured image data imaged by each of the imaging portions 14 (S102). Successively, the adhered substance detection processing portion 40a performs the detection of presence or absence of the adhered substance 52 on the basis of the captured image data obtained by the obtaining portion 38 (S104). In a case where the adhered substance 52 is detected (Yes at S106), the adhered substance detection processing portion 40a judges (estimates) the adhesion region of the adhered substance 52 (S108). The type estimation portion 40b performs the estimation of the type of the detected adhered substance 52 (S110). On the basis of the adhesion region of the adhered substance 52, the judgement portion 42 detects the reliable region (the unreliable region) of the arithmetic processing of the processing portion (the park assist portion 30, for example) that is performing (S112). In a case where the reliable region occupies a predetermined percentage or more (40% or greater, for example) of the imaging surface, the judgement portion 42 judges that the limited use is possible regarding the processing portion (the park assist portion 30, for example) that is performing (Yes at S114). The display manner processing portion 44a determines the display manner of the adhered substance 52 on the basis of the estimation result of the type estimation portion 40b (S116). The display manner processing portion 44a determines the contents of the display of the function display view 54 on the basis of the adhesion position of the adhered substance 52 (S118). For example, the display manner processing portion 44a determines the display of the white-line detection function display view 54a and determines the position at which the mark 58 including, for example, the cross "X" mark is to be displayed. On the basis of the function of the processing portion (the park assist portion 30, for example) that is performing and/or the adhesion position of the adhered substance 52, the message processing portion 44b reads out from, for example, the ROM 24b, the message which is to be presented to the user and determines the read-out message (S120). The message corresponds to the display message indicating that the limited use of the processing portion (the park assist portion 30, for example) is possible, and including "Adhered substance exists in the central region of the display screen and detection accuracy of the region is decreased. Visually check the central region.", for example.

The display processing portion 44 generates a composite or synthetic image in which the actual image 50, the function display view 54 and the display message to be displayed in the message region 48c are combined with each other, for example (S122). On the actual image 50 of the composite image, the adhered substance 52 of which the display manner has been determined is superimposed. The CPU 24a performs the image output processing of outputting the generated composite image via the display control portion 24d and causing the display apparatus 16 to display the image (S124).

At S114, in a case where the reliable region accounts for less than the predetermined percentage (less than 40%, for example) of the imaging surface, the judgement portion 42 makes the judgement, regarding the processing portion (the park assist portion 30, for example) which is performing, that a sufficient image recognition processing, for example, cannot be performed and thus the processing portion cannot be used (No at S114). The message processing portion 44b reads out, from the ROM 24b for example, the message indicating that the processing portion (the park assist portion 30, for example) is unusable and determines the message (S126). The message includes "Satisfactory image cannot be obtained due to the adhered substance. The white-line detection function using the image is stopped.", for example. The process moves to S122, where the composite image is generated. In this case, the function display view 54 may be undisplayed or hidden, or the mark 58 such as the "X" mark may be provided in all the regions, for example.

At S106, in a case where it is judged that the adhered substance 52 is absent (such adhered substance that influences the image processing does not exist) (No at S106), the message processing portion 44b reads out, from the ROM 24b for example, the message indicating that the processing portion (the park assist portion 30, for example) is usable in a normal manner and determines the message (S128). The message includes "The park assist is performed normally.", for example. The process moves to S122, where the composite image is generated. In this case, the function display view 54 may be displayed in a state where the mark 58 such as the "X" mark is not provided, or the function display view 54 may be undisplayed or hidden.

As described above, according to the adhered substance detection apparatus of the embodiment, the user is allowed to easily recognize the presence of the reliable region and the unreliable region in the image captured by the imaging portions 14. Also, the user can easily recognize that the arithmetic processing of the processing portion (processing apparatus) including the park assist portion 30 is maintained in the reliable region except for the region(s) to which the adhered substance 52 is adhered and that the processing portion is effectively usable in the reliable region. As a result, the processing portion (processing apparatus) and/or the user can be continuously provided with information including a utility value of other processing apparatus (processing portion) even in a case where the adhesion of the adhered substance 52 is detected.

In the aforementioned embodiment, the example is shown in which the first display region 48a displays a front view as the actual image 50 and the second display region 48b displays the function display view 54 indicating the detection state by the arithmetic processing performed by the processing portion with the use of the front image. In other example, for example, in a case where the processing portion performs the arithmetic processing with the use of a rear view, the rear view is displayed as the actual image 50 and the function display view 54 indicating the detection state with the use of the rear image is displayed in the second display region 48b.

For example, the program for the adhered substance detection processing performed at the CPU 24a of the embodiment may be configured to be recorded in computer-readable memory media including CD-ROM, a flexible disk (FD), a CD-R, a DVD (Digital Versatile Disk) and the like, in a form of a file that is installable or executable, and to be provided.

It can be configured such that the adhered substance detection processing program is stored on a computer connected to network including the internet and is provided by allowing the program to be downloaded via the network. The adhered substance detection processing program executed in the embodiment may be configured to be provided or distributed via network including the internet, for example.

The aforementioned embodiment and variations that are disclosed here are presented as examples and are not provided to intend to limit the scope of the disclosure. The embodiment and variations can be implemented in other various manners, and various omissions, substitutions and changes may be made without departing from the scope the disclosure. The embodiment and variations thereof are included in the scope and/or subject matter of the disclosure, and included in the disclosure described in the scope of claims and in a range of equivalents thereof.

According to the aforementioned embodiment, an adhered substance detection apparatus includes an obtaining portion 38 configured to obtain captured image data outputted from an imaging portion 14, 14a, 14b, 14c, 14d configured to be mounted on a vehicle 10 and a detection portion 40 configured to detect presence or absence of an adhered substance 52 of each of plural regions 46a of an imaging surface 46 of the imaging portion 14, 14a, 14b, 14c, 14d in a case where the imaging surface 46 is divided into the plural regions 46a, on the basis of the captured image data. The adhered substance detection apparatus includes a judgement portion 42 configured to distinguish a reliable region and an unreliable region from each other on the basis of the region 46a in which the adhered substance 52 is detected. In the reliable region, a reliability property of predetermined arithmetic processing performed by a processing apparatus 30, 32, 34, 36 with the use of the captured image data is kept to be equal to or greater than a predetermined value, and in the unreliable region, the reliability property is less than the predetermined value.

According to the above-described configuration, the presence of the reliable region and the unreliable region can be recognized by the user easily. The user is also made aware that the arithmetic processing is maintained in the reliable region other than the region to which the adhered substance 52 adhered and that the processing apparatus 30, 32, 34, 36 can be used effectively in the reliable region.

According to the aforementioned embodiment, the adhered substance detection apparatus further includes a display processing portion 44 configured to cause a display apparatus 16 to display the reliable region and the unreliable region in such a manner that the reliable region and the unreliable region are discernible from each other, on the basis of a judgement result of the judgement portion 42.

According to the above-described configuration, for example, the region in which the reliability property of the arithmetic processing is decreased by the adhesion of the adhered substance 52, and the region to which the adhered substance 52 is not adhered and the reliability is assured and a normal arithmetic process can be performed are easily recognized by the user.

According to the aforementioned embodiment, the detection portion 40 estimates a type of the adhered substance 52 in a case where the detection portion 40 detects the adhered substance 52.

According to the above-described configuration, the user is allowed to easily recognize what kind or type of adhered substance 52 is adhered.

According to the aforementioned embodiment, the display processing portion 44 is configured to determine a display manner of the adhered substance 52 in the unreliable region.

According to the above-described configuration, in a case where the adhered substance 52 exists, the user is easily made aware of the region in which the reliable processing is being performed by other processing apparatus.

According to the aforementioned embodiment, the display processing portion 44 is configured to display a notification message corresponding to the unreliable region.

According to the above-described configuration, the user is easily made to understand that the unreliable region exists in which the reliability of the arithmetic processing is less than the predetermined value, and/or that he or she needs to pay attention to the presence of the unreliable region.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An adhered substance detection apparatus comprising:
an obtaining portion configured to obtain captured image data outputted from an imaging portion configured to be mounted on a vehicle;
a detection portion configured to detect presence or absence of an adhered substance of each of plural regions of an imaging surface of the imaging portion in a case where the imaging surface is divided into the plural regions, on the basis of the captured image data;
a judgement portion configured to distinguish a reliable region and an unreliable region from each other on the basis of the region in which the adhered substance is detected; and
a display processing portion configured to cause a display apparatus to display the reliable region and the unreliable region in such a manner that the reliable region and the unreliable region are discernible from each other, on the basis of a judgement result of the judgement portion, wherein
in the reliable region, a reliability property of predetermined arithmetic processing performed by a processing apparatus with the use of the captured image data is kept to be equal to or greater than a predetermined value; and
in the unreliable region, the reliability property is less than the predetermined value.

2. The adhered substance detection apparatus according to claim 1, wherein the detection portion estimates a type of the adhered substance in a case where the detection portion detects the adhered substance.

3. The adhered substance detection apparatus according to claim 1, wherein the display processing portion is configured to determine a display manner of the adhered substance in the unreliable region.

4. The adhered substance detection apparatus according to claim 1, wherein the display processing portion is configured to display a notification message corresponding to the unreliable region.

\* \* \* \* \*